US012722178B2

(12) United States Patent
Chen et al.

(10) Patent No.: US 12,722,178 B2
(45) Date of Patent: Sep. 1, 2026

(54) BACK ROLLER AND PREPARATION METHOD THEREOF, AND COATING MACHINE

(71) Applicants: JIANGSU CONTEMPORARY AMPEREX TECHNOLOGY LIMITED, Changzhou (CN); CONTEMPORARY AMPEREX TECHNOLOGY CO., LIMITED, Ningde City (CN)

(72) Inventors: Shengdong Chen, Changzhou (CN); Guangcheng Zhong, Changzhou (CN); Huan Ren, Changzhou (CN); Lei Song, Changzhou (CN)

(73) Assignees: JIANGSU CONTEMPORARY AMPEREX TECHNOLOGY LIMITED, Changzhou (CN); CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 490 days.

(21) Appl. No.: 18/452,333

(22) Filed: Aug. 18, 2023

(65) Prior Publication Data

US 2024/0100556 A1 Mar. 28, 2024

Related U.S. Application Data

(63) Continuation of application No. PCT/CN2023/084461, filed on Mar. 28, 2023.

(30) Foreign Application Priority Data

Sep. 22, 2022 (CN) ......................... 202211154894.0

(51) Int. Cl.
*B05C 1/08* (2006.01)
*B65H 27/00* (2006.01)

(52) U.S. Cl.
CPC ............ *B05C 1/083* (2013.01); *B05C 1/0808* (2013.01); *B65H 27/00* (2013.01); *B65H 2401/23* (2013.01)

(58) Field of Classification Search
CPC ....... B05C 1/083; B05C 1/0808; B65H 27/00; B65H 2401/23; B65H 20/02;
(Continued)

(56) References Cited

U.S. PATENT DOCUMENTS

2003/0175519 A1 9/2003 Oshima
2006/0108744 A1 5/2006 Raueiser
2014/0116333 A1 5/2014 Humele et al.

FOREIGN PATENT DOCUMENTS

CN 202279559 U 6/2012
CN 102528382 A 7/2012
(Continued)

OTHER PUBLICATIONS

Diekman, "Cold and Cryogenic Treatment of Steel", ASM Handbook, vol. 4A, Steel Heat Treating Fundamentals and Processes, Aug. 2013. (Year: 2013).*
(Continued)

*Primary Examiner* — Christopher W Raimund
(74) *Attorney, Agent, or Firm* — Ladas & Parry, LLP

(57) ABSTRACT

A back roller includes a roller body and a wear-resistant layer. The roller body has an axis and a roll surface disposed around the axis. The wear-resistant layer covers the roll surface. Vickers hardness (H) of the wear-resistant layer is 800 HV≤H≤1400 HV. The roll surface is covered by the wear-resistant layer, and the Vickers hardness (H) of the wear-resistant layer is controlled to be between 800 HV and 1400 HV, so that the roll surface is effectively protected, and wear resistance of the roll surface is improved. In this way, the wear-resistant layer is in direct contact with a material
(Continued)

during operation, thereby effectively reducing an abrasion loss on the roll surface and extending the service life of the roll surface.

13 Claims, 6 Drawing Sheets

(58) Field of Classification Search
CPC . B65H 2401/15; B65H 2404/19; Y02E 60/10; C21D 1/25; C21D 6/04; C21D 9/38
See application file for complete search history.

(56) References Cited

FOREIGN PATENT DOCUMENTS

| | | | | | |
|---|---|---|---|---|---|
| CN | 103305664 | A | * | 9/2013 | |
| CN | 205839479 | U | | 12/2016 | |
| CN | 106756620 | A | | 5/2017 | |
| CN | 207547293 | U | | 6/2018 | |
| CN | 109694995 | A | * | 4/2019 | C21D 1/26 |
| CN | 109825790 | A | * | 5/2019 | |
| CN | 209063382 | U | | 7/2019 | |
| CN | 110499488 | A | * | 11/2019 | C21D 9/38 |
| CN | 209901387 | U | | 1/2020 | |
| CN | 110904382 | A | | 3/2020 | |
| CN | 111617926 | A | * | 9/2020 | C23C 4/129 |
| CN | 212025520 | U | * | 11/2020 | |
| CN | 212269010 | U | * | 1/2021 | |
| CN | 216500381 | U | | 5/2022 | |
| CN | 115044762 | A | | 9/2022 | |
| CN | 115246594 | A | | 10/2022 | |
| DE | 102004044803 | A1 | | 3/2006 | |
| JP | 2001073028 | A | | 3/2001 | |

OTHER PUBLICATIONS

Extended European search report for EP application No. 23751525.9, dated Jul. 23, 2024.
Kolobov et al. "Use of Cryogenic Treatment to Improve Profile-Bending Roll Wear Resistance", Metallurgist, vol. 61, Nos. 5-6, Sep. 2017 (Russian Original Nos. 5-6, May-Jun. 2017).
International Search Report of PCTCN2023084461 dated Sep. 22, 2022.
Written Opinion of the International Searching Authority of PCTCN2023084461 dated Sep. 22, 2022.
OA1 of priority application of CN202211154894.0 dated Nov. 4, 2022.
OA2 of priority application of CN202211154894.0 dated Nov. 21, 2022.
First search of priority application CN202211154894.0 dated Oct. 31, 2022.

* cited by examiner

BACK ROLLER AND PREPARATION METHOD THEREOF, AND COATING MACHINE

CROSS-REFERENCE TO RELATED APPLICATIONS

This application is a continuation of International Patent Application No. PCT/CN2023/084461, filed on Mar. 28, 2023, which claims priority to Chinese Patent Application No. 202211154894.0, filed on Sep. 22, 2022. The aforementioned patent applications are incorporated herein by reference in their entirety.

TECHNICAL FIELD

This application relates to the field of roller processing technologies, and in particular, to a back roller and a preparation method thereof, and a coating machine.

BACKGROUND

As an important component in processes such as material transfer and roll-in, back rollers are widely used in different industries, for example, coating in the lithium battery industry. During operation, a back roller usually provides driving force for material transfer by means of rolling friction, to ensure continuous operation of material handling. However, due to a defect in the structural design of conventional back rollers, surfaces of the back rollers are prone to wearing, shortening the service life.

SUMMARY

Based on this, it is necessary to provide a back roller and a preparation method thereof, and a coating machine, to improve wear resistance of a surface and extend the service life.

According to a first aspect, this application provides a back roller, including: a roller body, having an axis and a roll surface disposed around the axis; and a wear-resistant layer, covering the roll surface, where Vickers hardness of the wear-resistant layer is denoted as H, and 800 HV≤H≤1400 HV.

In the foregoing back roller, the roll surface is covered by the wear-resistant layer, and the Vickers hardness H of the wear-resistant layer is controlled to be between 800 HV and 1400 HV, so that the roll surface is effectively protected, and wear resistance of the roll surface is improved. In this way, the wear-resistant layer is in direct contact with a material during operation, thereby effectively reducing an abrasion loss on the roll surface and extending the service life of the roll surface. In addition, the wear-resistant layer is disposed on the roll surface, thereby avoiding out-of-range run-out on the roll surface due to wearing of an outer surface of the back roller during long-term use, and helping ensure operation accuracy.

In some embodiments, the Vickers hardness H further meets the following condition: 1200 HV≤H≤1400 HV. In this design, the hardness of the wear-resistant layer is properly controlled to be between 1200 HV and 1400 HV. This not only achieves effective wear resistance, but also can reduce a risk of material cracking, so that overall performance of the back roller is improved.

In some embodiments, thickness of the wear-resistant layer is denoted as h, and h>0.1 mm. In this way, the thickness of the wear-resistant layer is properly controlled, thereby helping improve overall structural performance of the back roller.

In some embodiments, the wear-resistant layer is formed as a tungsten carbide plating or a chromium plating. In this way, the wear-resistant layer is designed as the tungsten carbide plating or the chromium plating, thereby greatly improving wear resistance of the back roller and further extending the service life of a device.

In some embodiments, the roller body includes a first part and two second parts, the first part has the axis and the roll surface, and the two second parts are respectively connected to two opposite ends of the first part along a direction of the axis. In this way, the two second parts are respectively connected to the two opposite ends of the first part, allowing the first part to be mounted more securely and helping improve moving smoothness of the back roller.

In some embodiments, the roller body further includes a connector, a through-hole is provided in the first part along the direction of the axis, the connector is located in the through-hole, and the two second parts are connected to two ends of the connector along the direction of the axis. In this way, the connector connects the two second parts, helping improve bonding strength between the second parts and enhancing overall structural strength of the back roller.

In some embodiments, the two second parts are respectively embedded in two opposite ends of the through-hole, an inner wall of the through-hole is provided with a first limiting portion, a second limiting portion is provided on a side of one second part facing the connector, and the first limiting portion and the second limiting portion fit together for position limiting along the direction of the axis. In this way, when the first limiting portion and the second limiting portion fit together for position limiting, the second part can be effectively prevented from being further inserted into the through-hole, thereby implementing proper position limiting and facilitating mounting of the second part on the first part.

According to a second aspect, this application provides a back roller preparation method, applied to the back roller according to any one of the foregoing embodiments. The method includes the following steps: providing a roller blank, where the roller blank has an axis and a roll surface disposed around the axis; performing surface treatment on the roll surface to form a wear-resistant layer on the roll surface; performing heat treatment on the surface-treated roller blank; and after the heat treatment, processing the roller blank according to a specified size to obtain the back roller.

In the foregoing back roller preparation method, the wear-resistant layer is formed on the roll surface through the surface treatment process, thereby effectively reducing an abrasion loss on the roll surface and extending the service life of the roll surface. In addition, this can also avoid out-of-range run-out on the roll surface due to wearing of an outer surface of the back roller during long-term use, thereby helping ensure operation accuracy. In addition, an internal structure of the roller blank is optimized through the heat treatment process, thereby improving overall performance of the back roller.

In some embodiments, the step of performing heat treatment on the surface-treated roller blank includes: performing cryogenic treatment on the surface-treated roller blank to leave the roller blank at any temperature between −196° C. and −180° C. for at least 20 h to 28 h, where the roller blank is made of chromium-containing alloy steel; and after the cryogenic treatment, performing tempering treatment on the roller blank. The cryogenic process is added to a preparation process of the back roller to martensitize retained austenite, so as to ensure uniform crystal distribution of the roller blank, improve an internal stress variation of a material of the back roller, and enhance structural performance of the back roller.

In some embodiments, the step of performing cryogenic treatment on the surface-treated roller blank includes: consecutively reducing a temperature of an ambient environment of the roller blank at least twice in a step-wise manner within a first preset period of time, so that the temperature of the ambient environment of the roller blank falls to any temperature value between −196° C. and −180° C.; keeping the temperature of the ambient environment unchanged, so that the roller blank stands for 20 h to 28 h; and after the standing, consecutively increasing the temperature of the ambient environment of the roller blank at least twice in a step-wise manner within a second preset period of time, so that the temperature of the ambient environment of the roller blank rises to any temperature value between 10° C. and 30° C. In this way, the cryogenic process is properly controlled, so that crystals in the internal structure of the roller blank are distributed more uniformly, thereby further enhancing structural performance of the back roller.

In some embodiments, during each step-wise temperature reduction, within a first specified period of time, the temperature is reduced by a first temperature value at a preset cooling rate and then kept unchanged, where the first preset period of time includes several first specified periods of time. In this way, during each step-wise temperature reduction, the temperature is reduced at the preset cooling rate, so that temperature for the cryogenic treatment is more controllable, thereby improving accuracy of the cryogenic treatment and ensuring consistent performance of the back rollers after the treatment.

In some embodiments, the first specified period of time is a time value ranging from 4 h to 6 h, and the first temperature value is a temperature value ranging from 10° C. to 40° C. In this way, the first specified period of time and the first temperature value are properly controlled, optimizing step-wise temperature reduction control and improving the structural performance of the back roller after the treatment.

In some embodiments, during each step-wise temperature rise, within a second specified period of time, the temperature is increased by a second temperature value at a preset heating rate and then kept unchanged, where the second preset period of time includes several second specified periods of time. In this way, during each step-wise temperature rise, the temperature is increased at the preset heating rate, so that temperature of the cryogenic treatment is more controllable, thereby improving accuracy of the cryogenic treatment and ensuring consistent performance of the back rollers after the treatment.

In some embodiments, the second specified period of time is a time value ranging from 4 h to 6 h, and the second temperature value is a temperature value ranging from 40° C. to 90° C. In this way, the second specified period of time and the second temperature value are properly controlled, optimizing step-wise temperature rise control and improving the structural performance of the back roller after the treatment.

In some embodiments, the step of performing surface treatment on the roll surface includes: spraying a tungsten carbide coating on the roll surface to form the wear-resistant layer. In this way, the wear-resistant layer is formed on the roll surface by spraying tungsten carbide, improving the wear resistance performance of the back roller.

In some embodiments, the step of providing a roller blank includes: respectively mounting two second parts at two opposite ends of a first part in a hot-fitting manner, and welding joints between the two second parts and the first part to form an intermediate part with the roll surface; performing thermal refining on the intermediate part; and after the thermal refining, performing intermediate frequency quenching on the roll surface to obtain the roller blank. A structure of the roller blank is optimized through processes such as thermal refining and intermediate frequency quenching, improving overall performance of the back roller.

According to a third aspect, this application provides a coating machine, including the back roller according to any one of the foregoing embodiments.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the embodiments of this application and in the conventional technology more clearly, the following briefly describes the accompanying drawings required for describing the embodiments and the conventional technology. Apparently, the accompanying drawings in the following description show merely the embodiments of this application, and persons of ordinary skill in the art may still derive other drawings from the disclosed accompanying drawings without creative efforts.

DESCRIPTION OF REFERENCE NUMBERS

100: back roller;
10: roller body;
11: roll surface;
12: first part;
12*a*: through-hole;
12*b*: first limiting portion;
13: second part;

13*a*: second limiting portion;
14: connector;
15: axis; and
20: wear-resistant layer.

DETAILED DESCRIPTION

The following clearly and completely describes technical solutions in the embodiments of this application with reference to the accompanying drawings in the embodiments of this application. Apparently, the described embodiments are only some but not all of the embodiments of this application. All other embodiments obtained by persons of ordinary skill in the art based on the embodiments of this application without creative efforts shall fall within the protection scope of this application.

As an important component in processes such as material transfer and roll-in, back rollers are widely used in different industries, for example, coating in the lithium battery industry. During operation, a back roller usually provides driving force for material transfer by means of rolling friction, to ensure continuous operation of material handling.

The applicant notes that a surface of a conventional back roller is prone to wearing due to friction with materials during operation, seriously shortening the service life of the back roller and increasing operation costs. In addition, when the surface of the back roller is worn, looseness between the surface of the back roller and the materials leads to out-of-range run-out during material transfer, for example, a run-out spacing is greater than 2 μm, affecting operation accuracy. For example, during coating, an axial weight of the coating is affected due to out-of-range run-out.

Based on this, to resolve problems of shortened service life and operation inaccuracy caused by easy wearing of the back roller, the applicant designs a back roller through in-depth researches. A wear-resistant layer covers a roll surface, where Vickers hardness of the wear-resistant layer is denoted as H, and 800 HV≤H≤1400 HV.

The roll surface is covered by the wear-resistant layer, and the Vickers hardness H of the wear-resistant layer is controlled to be between 800 HV and 1400 HV, so that the roll surface is effectively protected, and wear resistance of the roll surface is improved. In this way, the wear-resistant layer is in direct contact with a material during operation, thereby effectively reducing an abrasion loss on the roll surface and extending the service life of the roll surface. In addition, the wear-resistant layer is disposed on the roll surface, thereby avoiding out-of-range run-out on the roll surface due to wearing of an outer surface of the back roller during long-term use, and helping ensure operation accuracy.

The back roller disclosed in the embodiments of this application may be used in, but is not limited to, an apparatus such as a coating machine, an electrode plate roller press, or a logistics transfer machine.

Figure 1:
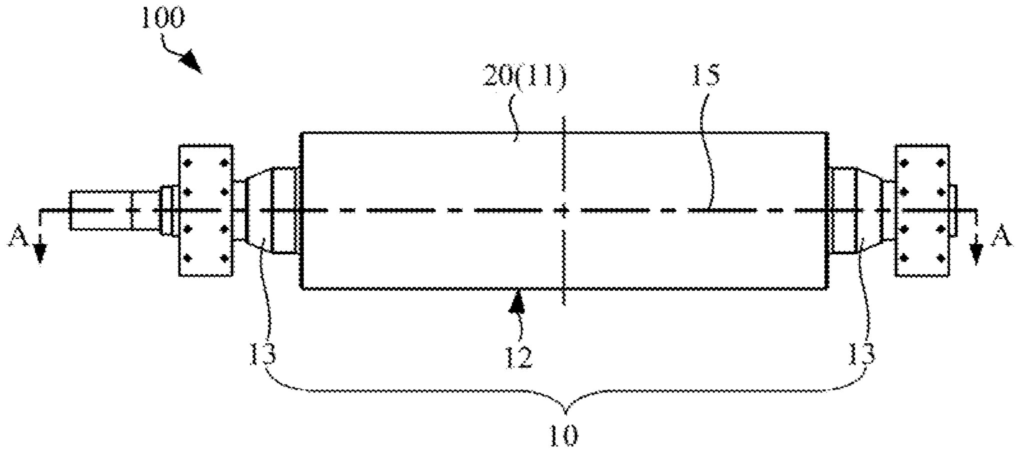
FIG. 1 is a schematic structural diagram of a back roller according to some embodiments of this application.
Figure 2:
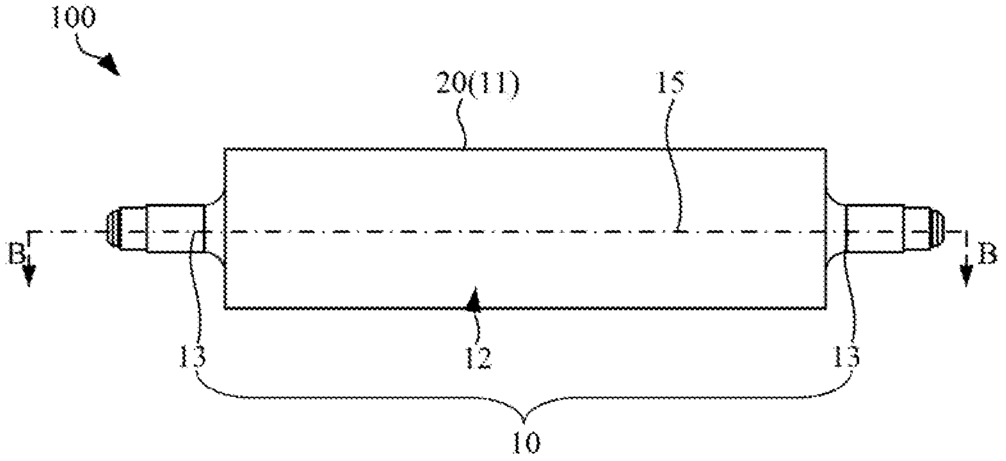
FIG. 2 is a schematic structural diagram of a back roller according to some other embodiments of this application.

According to some embodiments of this application, as shown in FIG. 1 and FIG. 2, this application provides a back roller 100. The back roller 100 includes a roller body 10 and a wear-resistant layer 20. The roller body 10 has an axis 15 and a roll surface 11 disposed around the axis 15. The wear-resistant layer 20 covers the roll surface 11. Vickers hardness of the wear-resistant layer 20 is denoted as H, and 800 HV≤H≤1400 HV.

The roller body 10 is a main structure in the back roller 100 and is a part capable of rotating around the axis 15 to achieve a function of transferring or squeezing materials. The roller body 10 should be designed with specific structural strength. For example, a material of the roller body 10 may be, but is not limited to, alloy steel, alloy aluminum, ceramic, hard plastic, or a metal composite material with a rubber coating.

The roll surface 11 is an outer surface around the axis 15 on the roller body 10, and is designed into a circular curved surface. The wear-resistant layer 20 is a layer of protective structure that covers the roll surface 11 and that has specific hardness, and can reduce an amount of material wearing during material transfer.

The wear-resistant layer 20 may be formed on the roll surface 11 in various manners, for example, spraying, electroplating, or anodizing, provided that the wear-resistant layer 20 can be securely bonded to the roll surface 11. The wear-resistant layer 20 on the roll surface 11 should be disposed at least along a circumferential direction of the roll surface 11, and whether the wear-resistant layer 20 needs to cover the entire roll surface 11 may be determined based on actual needs. Certainly, if the wear-resistant layer 20 covers the entire roll surface 11, the obtained back roller 100 has higher performance and wear resistance.

For the Vickers hardness, a diamond regular pyramid indenter with an included angle of 136° between opposite surfaces is pressed into a surface of a specimen under a specified load and kept for a specific period of time, then the load is removed and a diagonal length of an indentation is measured, then a surface area of the indentation is calculated, and finally, average pressure on the surface area of the indentation is calculated, where the average pressure is a Vickers hardness value of metal. Specifically, the Vickers hardness of the wear-resistant layer 20 may be directly measured by using a Vickers hardness tester, or may be measured through conversion. For example, hardness is measured by using a Leeb hardness tester and then converted into Vickers hardness based on a conversion table. Leeb hardness is a value calculated based on a ratio between a rebound velocity and an impact velocity of an impact head at a distance of 1 mm from a surface of a specimen when an impactor with specified mass impacts the surface of the specimen at a specific velocity under the action of an elastic force. A calculation formula for the Leeb hardness tester is as follows: $HL=1000\times Vb/Va$, where HL is a Leeb hardness symbol, Va is an impact velocity of a ball head, in m/s, and Vb is a rebound velocity of the ball head, in m/s. During hardness measurement of the wear-resistant layer 20, a test point is determined at every 200 mm or the like along a direction of the axis 15.

The hardness of the wear-resistant layer 20 should be controlled to be between 800 HV and 1400 HV. For example, the hardness of the wear-resistant layer 20 may be, but is not limited to, stepped hardness such as 800 HV, 850 HV, 900 HV, 950 HV, 1000 HV, 1100 HV, 1200 HV, 1300 HV, and 1400 HV A tolerance of each stepped hardness is ±40 HV to ensure consistency of hardness distribution. If the hardness of the wear-resistant layer 20 is excessively low, a wear resistance requirement is not met. If the hardness of the wear-resistant layer 20 is excessively high, the material is prone to cracking, and costs are high.

The roll surface 11 is covered by the wear-resistant layer 20, and the Vickers hardness H of the wear-resistant layer 20 is controlled to be between 800 HV and 1400 HV, so that the roll surface 11 is effectively protected, wear resistance of the roll surface 11 is improved, and the service life of the roll surface 11 is extended. In addition, the wear-resistant layer 20 is disposed on the roll surface 11, thereby avoiding out-of-range run-out on the roll surface 11 due to wearing of an outer surface of the back roller 100 during long-term use, and helping ensure operation accuracy.

According to some embodiments of this application, the Vickers hardness H further meets the following condition: 1200 HV≤H≤1400 HV.

The hardness of the wear-resistant layer 20 may be further controlled to be between 1200 HV and 1400 HV. For example, the hardness of the wear-resistant layer 20 may be, but is not limited to, 1200 HV, 1250 HV, 1300 HV, 1350 HV, and 1400 HV.

The hardness of the wear-resistant layer 20 is properly controlled to be between 1200 HV and 1400 HV. This not only achieves effective wear resistance, but also can reduce a risk of material cracking, so that overall performance of the back roller 100 is improved.

Figure 3:
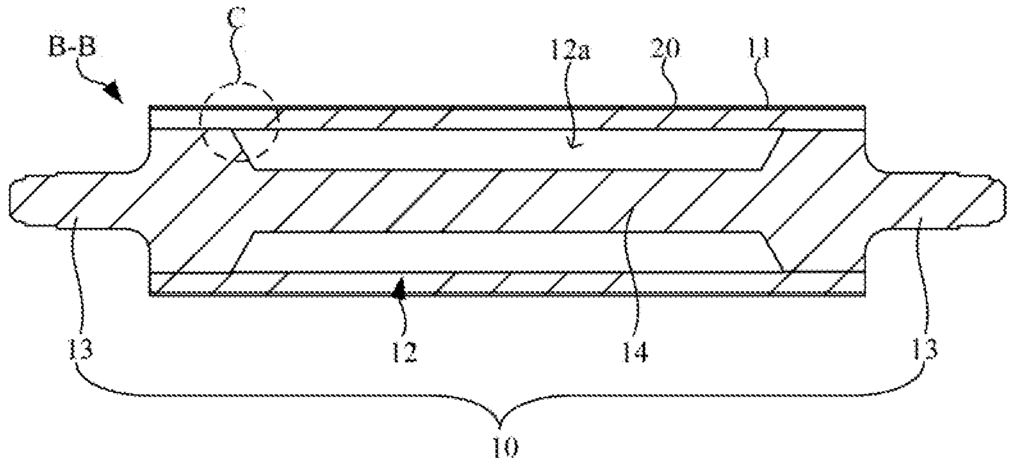
FIG. 3 is a cross-sectional view of the back roller in FIG. 2 along a B-B direction.
Figure 4:
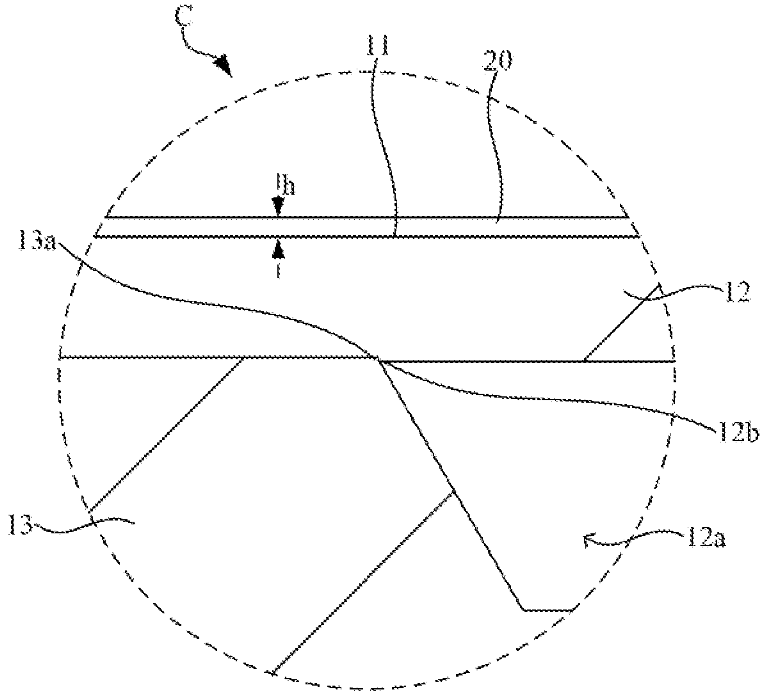
FIG. 4 is a schematic enlarged view of a structure at a circle C in FIG. 3.

According to some embodiments of this application, as shown in FIG. 3 and FIG. 4, thickness of the wear-resistant layer 20 is denoted as h, and h>0.1 mm.

The thickness of the wear-resistant layer 20 affects the performance of the wear-resistant layer 20 to some extent. For example, under an allowable abrasion loss, if the wear-resistant layer 20 is excessively thin, the roll surface 11 is likely to be directly exposed, affecting the service life of the back roller 100. Therefore, the thickness h of the wear-resistant layer 20 should be controlled to be a value greater than 0.1 mm.

The thickness of the wear-resistant layer 20 is properly controlled, thereby helping improve overall structural performance of the back roller 100.

According to some embodiments of this application, the wear-resistant layer 20 is formed as a tungsten carbide plating or a chromium plating.

Tungsten carbide is a compound consisting of tungsten and carbon, has a molecular formula of WC and a molecular weight of 195.85, is a black hexagonal crystal with metallic luster, and has a hardness similar to that of diamond.

For ease of describing wear resistance of the tungsten carbide, wear resistance tests are separately performed on a conventional back roller 100 and the back roller 100 of this application. Running distances of both back rollers 100 are calculated when an abrasion loss reaches 20 μm to 30 μm. The running distance of the conventional back roller 100 is 1,000,000 meters to 1,500,000 meters. The running distance of the back roller 100 of this application is 5,000,000 meters to 9,000,000 meters, and wear resistance of the back roller 100 of this application is improved by approximately 4 times. In addition, the chromium plating is obtained by plating hard chrome on the roll surface 11 to improve wear resistance of the roll surface 11.

The wear-resistant layer 20 is designed as the tungsten carbide plating or the chromium plating, thereby greatly improving wear resistance of the back roller 100, and further extending the service life of a device.

According to some embodiments of this application, as shown in FIG. 3, the roller body 10 includes a first part 12 and two second parts 13. The first part 12 has the axis 15 and the roll surface 11. The two second parts 13 are respectively connected to two opposite ends of the first part 12 along a direction of the axis 15.

The first part 12 is a structure for carrying or transferring materials in the back roller 100, and the second parts 13 on both sides are structures for mounting the first part 12 on another apparatus, for example, may be understood as shaft head structures. During actual operation, the second parts 13, as mounting parts, are usually connected to another apparatus through bearings. For example, the bearings may be ultra-high-precision wear-resistant ceramic bearings (for example, NSK 70BNR10H).

The first part 12 and the second parts 13 may be connected through hot-fitting, welding, or the like. For example, the second part 13 is mounted at one end of the first part 12 through hot-fitting, and after the hot-fitting, a joint between the first part 12 and the second part 13 is welded.

The two second parts 13 are respectively connected to the two opposite ends of the first part 12, allowing the first part 12 to be mounted more securely and helping improve moving smoothness of the back roller 100.

According to some embodiments of this application, as shown in FIG. 3, the roller body 10 further includes a connector 14. A through-hole 12*a* is provided in the first part 12 along the direction of the axis 15. The connector 14 is located in the through-hole 12*a*, and the two second parts 13 are connected to two ends of the connector 14 along the direction of the axis 15.

The connector 14 may connect the two second parts 13 through bolting, clamping, welding, integral formation, or by other means. The integral formation may be implemented by means of die-casting, casting, extrusion, forging, or the like.

Figure 5:
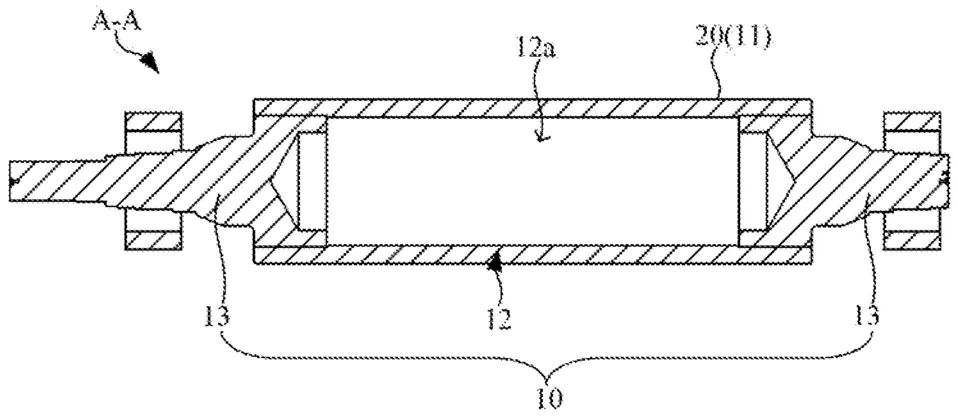
FIG. 5 is a cross-sectional view of the back roller in FIG. 1 along an A-A direction.

It should be noted that, when the connector 14 connects the two second parts 13, the two second parts 13 also needs to be connected to the first part 12. For example, the second part 13 is mounted on one end of the through-hole 12*a* through hot-fitting, and then the first part 12 is welded to the second part 13. In addition, the back roller 100 of this application may be assembled in various manners. For example, during assembly, the two second parts 13 and 1*i* the connector 14 are assembled into an integral structure, and then the integral structure is inserted into the through-hole 12*a* as a whole and connected to the first part 12. Certainly, in some other embodiments, as shown in FIG. 5, no connector 14 is provided between the two second parts 13.

The connector 14 connects the two second parts 13, thereby helping improve bonding strength between the second parts 13 and enhancing overall structural strength of the back roller 100.

According to some embodiments of this application, as shown in FIG. 4, the two second parts 13 are respectively embedded in two opposite ends of the through-hole 12*a*. An inner wall of the through-hole 12*a* is provided with a first limiting portion 12*b*. A second limiting portion 13*a* is provided on a side of one second part 13 facing the connector 14. The first limiting portion 12*b* and the second limiting portion 13*a* fit together for position limiting along the direction of the axis 15.

The second limiting portion 13*a* is provided on the side, of the one second part 13 facing the connector 14. In this way, when the first limiting portion 12*b* and the second limiting portion 13*a* fit together for position limiting, the second part 13 can be effectively prevented from being further inserted into the through-hole 12*a*, thereby implementing proper position limiting effects, and facilitating mounting of the second part 13 on the first part 12.

When the two second parts 13 and the connector 14 are mounted on the first part 12 as an integral structure, an outer diameter of the second part 13 without the second limiting portion 13*a* may be designed to be smaller than an outer diameter of the other second part 13, so that the second part 13 with the smaller outer diameter can pass through a section with the first limiting portion 12*b* in the through-hole 12*a*. In this way, during assembly, the second part 13 with the smaller outer diameter may be inserted into the through-hole 12*a* from an end close to the first limiting portion 12*b* and led out from the other end of the through-hole 12*a* until the second limiting portion 13*a* and the first limiting portion 12*b* fit together for position limiting.

Alternatively, both the first limiting portion 12*b* and the second limiting portion 13*a* may be designed into convex structures, or a step face may be directly cut on a hole wall of the through-hole 12*a* or on the second part 13.

When the first limiting portion 12*b* and the second limiting portion 13*a* fit together for position limiting, the second part 13 can be effectively prevented from being further inserted into the through-hole 12*a*, thereby implementing proper position limiting effects, and facilitating mounting of the second part 13 on the first part 12.

Figure 6:
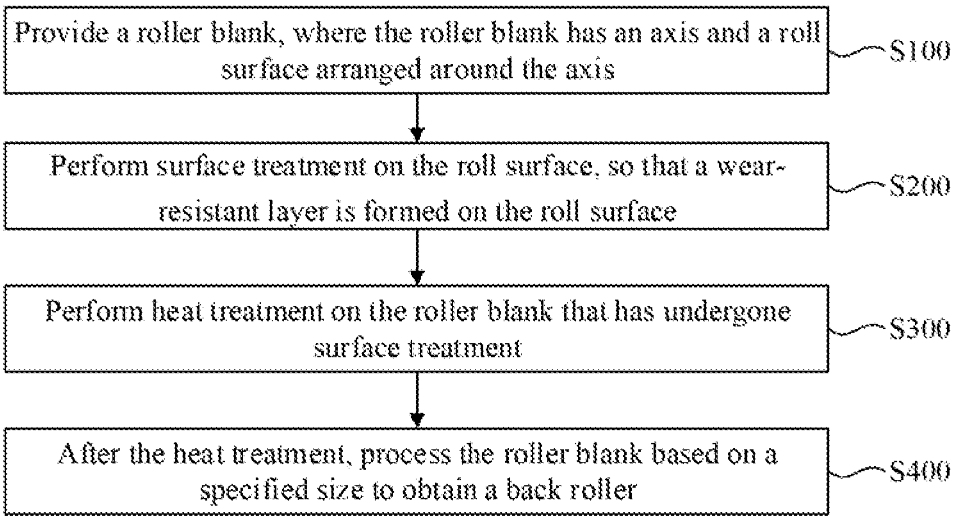
FIG. 6 is a first flowchart of preparation of a back roller according to some embodiments of this application.

According to some embodiments of this application, as shown in FIG. 6, this application provides a back roller preparation method, applied to the back roller 100 according to any one of the foregoing implementations. The back roller preparation method includes the following steps.

S100: Provide a roller blank, where the roller blank has an axis 15 and a roll surface 11 disposed around the axis 15.

S200: Perform surface treatment on the roll surface 11 to form a wear-resistant layer 20 on the roll surface 11.

S300: Perform heat treatment on the surface-treated roller blank.

S400: After the heat treatment, process the roller blank according to a specified size to obtain the back roller 100.

The roller blank is an unprocessed and untrimmed structure of a roller body 10. For example, in terms of a size, the roller blank has a specific processing margin; or in terms of a shape, there is an excess margin for turning; or in terms of structural performance, the roller blank further needs to undergo a proper heat treatment process to achieve structural performance of the roller body 10.

In step S200, surface treatment may be performed in a plurality of manners, for example, through a spraying process, an electroplating process, or an anodizing process, provided that the wear-resistant layer 20 can be formed on the roll surface 11.

The heat treatment is a thermal metal processing process in which a material in a solid state undergoes means of heating, heat preservation, and cooling to obtain an expected organization and expected performance. The heat treatment process is added in step S300, thereby helping improve structural performance of the roller blank.

In step S400, the roller blank may be processed in a plurality of manners. For example, after the heat treatment, a profile length and a diameter undergo finish turning to reach specified sizes; then the roll surface 11 and outer circumferences of all shaft heads (for example, the second parts 13) on the roller blank undergo fine grinding to obtain respective required sizes; shaft head positions are electroplated, and undergo fine grinding again after the electroplating; then dynamic balancing collection is performed on roller shafts in the roller blank; and finally, the shaft heads undergo cylindrical grinding to obtain the back roller 100.

In the foregoing back roller preparation method, the wear-resistant layer 20 is formed on the roll surface 11 through the surface treatment process, thereby effectively reducing an abrasion loss on the roll surface 11, and extending service life of the roll surface 11. In addition, this can also avoid out-of-range run-out on the roll surface 11 due to wearing of an outer surface of the back roller 100 during long-term use, thereby helping ensure operation accuracy. In addition, an internal structure of the roller blank is optimized through the heat treatment process, thereby improving overall performance of the back roller 100.

Figure 7:
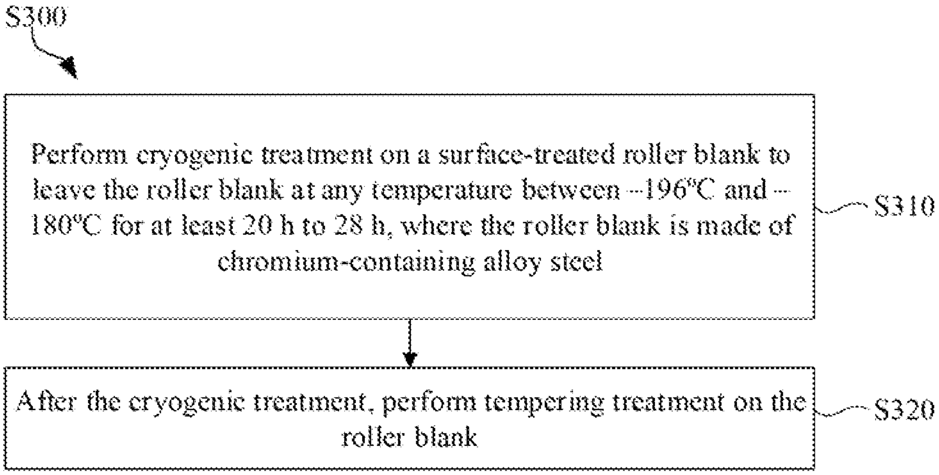
FIG. 7 is a second flowchart of preparation of a back roller according to some embodiments of this application.

According to some embodiments of this application, as shown in FIG. 7, the step of performing heat treatment on the surface-treated roller blank in S300 includes the following steps.

S310: Perform cryogenic treatment on the surface-treated roller blank to leave the roller blank at any temperature between −196° C. and −180° C. for at least 20 h to 28 h, where the roller blank is made of chromium-containing alloy steel.

S320: After the cryogenic treatment, perform tempering treatment on the roller blank.

In step S310, the roller blank may stand at any temperature between −196° C. and −180° C., for example, −180° C., −182° C., −184° C., −186° C., −188° C., −190° C., −192° C., −194° C., or −196° C. In addition, a standing time may be but is not limited to 20 h, 22 h, 24 h, 26 h, or 28 h.

In addition, the standing of the roller blank at −196° C. to −180° C. may be implemented in a plurality of manners. For example, a test environment may be pre-cooled to required temperature, and the roller blank is placed in the test environment after the temperature is reached; or the roller blank is placed in the test environment in advance, and then the test environment is gradually cooled to the required temperature.

The roller blank is chromium-containing alloy steel, for example, 40CR, and stands at any temperature between −196° C. and −180° C. for a period of time to martensitize retained austenite, so as to ensure uniform crystal distribution of the roller blank, and improve an internal stress variation of a material of the back roller 100.

The tempering treatment in step S320 means that the roller blank that has undergone the cryogenic treatment stands at specific temperature to release a part of residual stress caused by the cryogenic treatment, so as to improve structural toughness of the back roller 100.

The cryogenic process is added to a preparation process of the back roller 100 to martensitize retained austenite, so as to ensure uniform crystal distribution of the roller blank, improve an internal stress variation of a material of the back roller 100, and enhance structural performance of the back roller 100.

Figure 8:
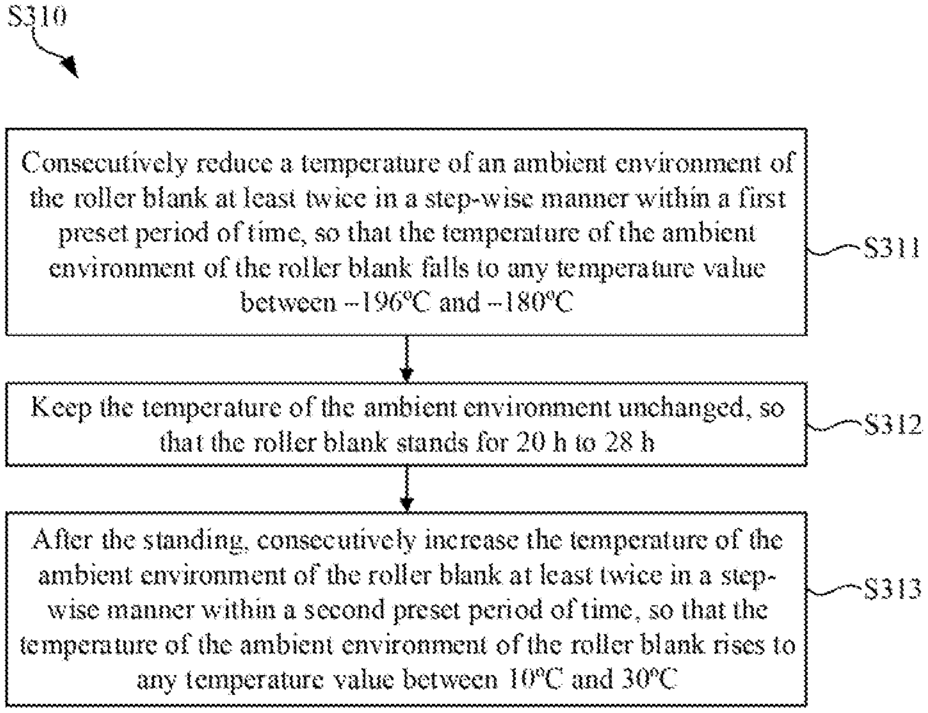
FIG. 8 is a third flowchart of preparation of a back roller according to some embodiments of this application.

According to some embodiments of this application, as shown in FIG. 8, the step of performing cryogenic treatment on the surface-treated roller blank in S310 includes the following steps.

S311: Consecutively reduce a temperature of an ambient environment of the roller blank at least twice in a step-wise manner within a first preset period of time, so that the temperature of the ambient environment of the roller blank falls to any temperature value between −196° C. and −180° C.

S312: Keep the temperature of the ambient environment unchanged, so that the roller blank stands for 20 h to 28 h.

S313: After the standing, consecutively increase the temperature of the ambient environment of the roller blank at least twice in a step-wise manner within a second preset period of time, so that the temperature of the ambient environment of the roller blank rises to any temperature value between 10° C. and 30° C.

The step-wise temperature reduction means that the temperature is first reduced to a specific temperature value, and the temperature value is maintained for a period of time. The step-wise temperature reduction can avoid phenomena such as brittleness and cracking of the material due to rapid direct cooling of the roller blank. The temperature may be reduced to a specific temperature value at a constant temperature reduction rate or a variable temperature reduction rate.

Similarly, the step-wise temperature rise means that the temperature is first increased to a specific temperature value, and the temperature value is maintained for a period of time. The step-wise temperature rise can also avoid phenomena such as chapping of the material due to rapid direct heating of the roller blank.

In step S313, the temperature is increased to any temperature value between 10° C. and 30° C. For example, the temperature is increased to 10° C., 15° C., 20° C., 25° C., or 30° C. Specifically, in some embodiments, the at least two consecutive step-wise temperature rises are performed on the ambient environment of the roller blank within the second preset period of time, so that the temperature of the ambient environment of the roller blank rises to 20° C.

In this way, the cryogenic process is properly controlled, so that crystals in the internal structure of the roller blank are distributed more uniformly, thereby further enhancing structural performance of the back roller 100.

According to some embodiments of this application, during each step-wise temperature reduction, within a first specified period of time, the temperature is first reduced by a first temperature value at a preset cooling rate, and then the temperature remains unchanged, where the first preset period of time includes several first specified period of times.

The preset cooling rate is a temperature value reduced per unit time. The preset cooling rate may remain the same or vary during different step-wise temperature reductions. For example, being closer to a temperature value between −196° C. and −180° C. indicates a smaller cooling rate in a step-wise temperature reduction.

During each step-wise temperature reduction, the temperature is reduced at the preset cooling rate, so that temperature of the cryogenic treatment is more controllable, thereby improving accuracy of the cryogenic treatment and ensuring consistent performance of the back rollers 100 after the treatment.

According to some embodiments of this application, the first specified period of time is a time value ranging from 4 h to 6 h, and the first temperature value is a temperature value ranging from 10° C. to 40° C.

The first specified period of time may be but is not limited to 4 h, 4.5 h, 5 h, 5.5 h, 6 h, or the like. The first temperature value may be but is not limited to 10° C., 15° C., 20° C., 25° C., 30° C., 35° C., 40° C., or the like. Specifically, in some embodiments, the first specified period of time is 4 h.

The first specified period of time and the first temperature value are properly controlled, to optimize step-wise temperature reduction control and ensure higher structural performance of the back roller 100 after the treatment.

According to some embodiments of this application, during each step-wise temperature rise, within a second specified period of time, the temperature is first increased by a second temperature value at a preset heating rate, and then the temperature remains unchanged, where the second preset period of time includes several second specified period of times.

The preset heating rate is a temperature value increased per unit time. The preset heating rate may remain the same or vary during different step-wise temperature rises. For example, being closer to 10° C.-30° C. indicates a higher heating rate in a step-wise temperature rise.

During each step-wise temperature rise, the temperature is increased at the preset heating rate, so that temperature of the cryogenic treatment is more controllable, thereby improving accuracy of the cryogenic treatment and ensuring consistent performance of the back rollers 100 after the treatment.

According to some embodiments of this application, the second specified period of time is a time value ranging from 4 h to 6 h, and the second temperature value is a temperature value ranging from 40° C. to 90° C.

Figure 9:
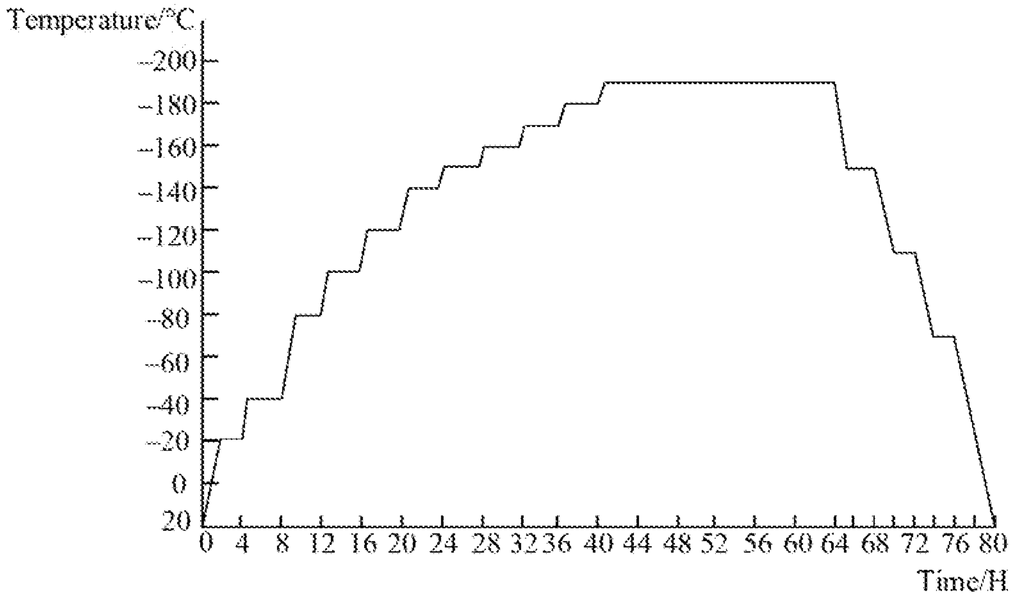
FIG. 9 is a line graph of cryogenic treatment according to some embodiments of this application.

The second specified period of time may be but is not limited to 4 h, 4.5 h, 5 h, 5.5 h, 6 h, or the like. The second temperature value may be but is not limited to 10° C., 15° C., 20° C., 25° C., 30° C., 35° C., 40° C., 50° C., 60° C., 70° C., 80° C., 90° C., or the like. Specifically, in some embodiments, the second specified period of time is 4 h. Specifically, in some embodiments, as shown in FIG. 9, 11 step-wise temperature reductions are performed during the cryogenic treatment, so that ambient temperature of the roller blank is −190° C.; the roller blank stands at −190° C. for 24 h; and finally, four step-wise temperature rises are performed, so that the ambient temperature rises to 20° C.

The second specified period of time and the second temperature value are properly controlled, to optimize step-wise temperature rise control and ensure higher structural performance of the back roller 100 after the treatment.

Figure 10:
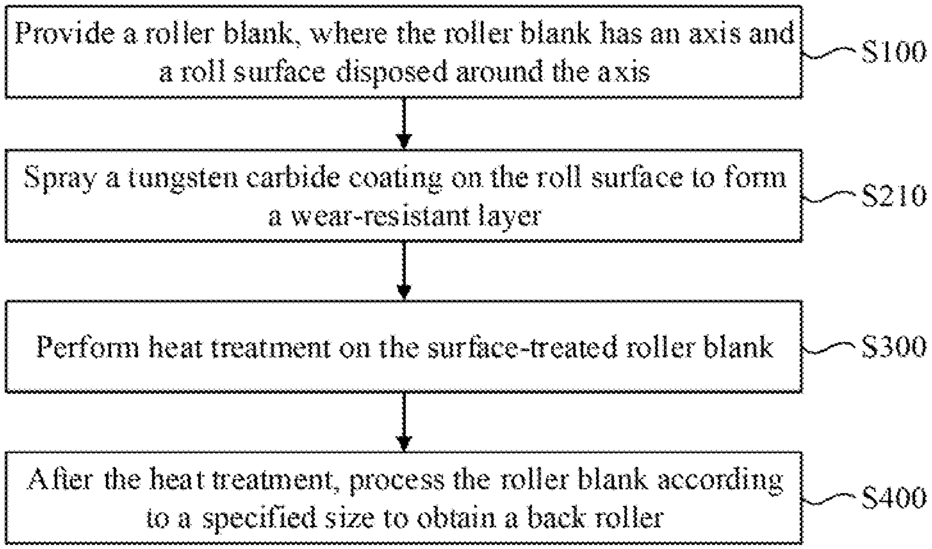
FIG. 10 is a fourth flowchart of preparation of a back roller according to some embodiments of this application.

According to some embodiments of this application, as shown in FIG. 10, the step of performing surface treatment on the roll surface 11 in S200 includes the following step.

S210: Spray a tungsten carbide coating on the roll surface 11 to form the wear-resistant layer 20.

A spraying manner may be, but is not limited to, sonic spraying and ultrasonic spraying. When tungsten carbide is sprayed at an ultrasonic speed, the coating is highly dense. This can reduce porosity and improve performance of the roll surface 11 while helping improve overall strength of the back roller 100.

The wear-resistant layer 20 is formed on the roll surface 11 by spraying tungsten carbide, improving the wear resistance performance of the back roller 100.

Figure 11:
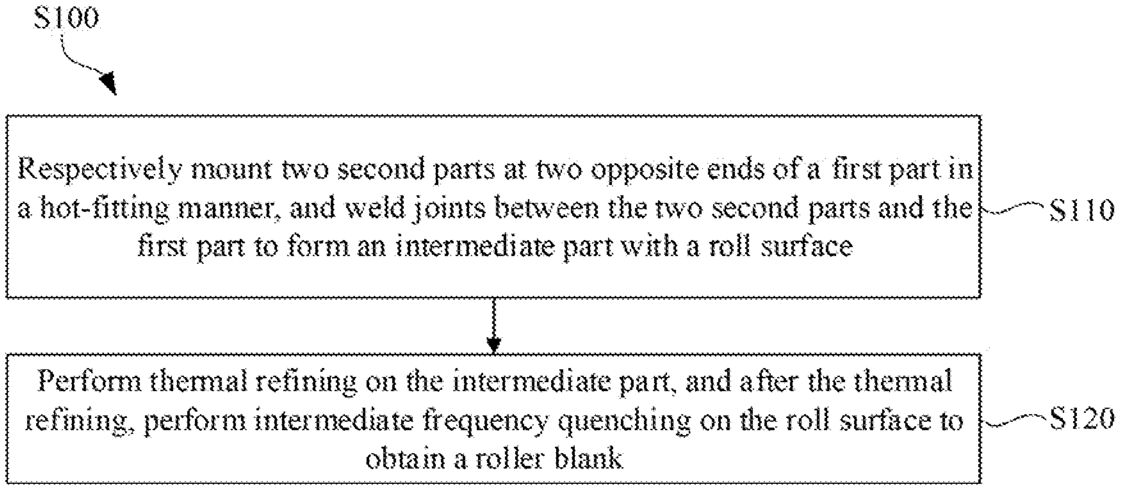
FIG. 11 is a fifth flowchart of preparation of a back roller according to some embodiments of this application.

According to some embodiments of this application, as shown in FIG. 11, the step of providing a roller blank in S100 includes the following steps.

S110: Respectively mount two second parts 13 at two opposite ends of a first part 12 in a hot-fitting manner, and weld joints between the two second parts 13 and the first part 12 to form an intermediate part with the roll surface 11.

S120: Perform thermal refining on the intermediate part, and after the thermal refining, perform intermediate frequency quenching on the roll surface 11 to obtain the roller blank.

The intermediate part is a roller blank that has not undergone thermal refining or intermediate frequency quenching. The thermal refining is a heat treatment method of high-temperature tempering after quenching. For example, tempering temperature is controlled to be 500° C.-650° C.

The intermediate frequency quenching means: A metal part is placed in an induction coil, and alternating-current power is supplied to the induction coil to generate an alternating electromagnetic field and induce an alternating current in the metal part. Due to skin effects, the current mainly gathers on a surface of the metal part, and therefore, temperature on the surface is the highest. The induction coil is followed by cooling through water spraying or in another manner. Because heating and cooling mainly target at the surface, surface modification is quite obvious, but internal modification is basically not involved, thereby implementing heat treatment with surface modification. For specific parameter control of the thermal refining and the intermediate frequency quenching, directly refer to existing literature. Details are not described herein again.

A structure of the roller blank is optimized through processes such as thermal refining and intermediate frequency quenching, improving overall performance of the back roller 100.

According to some embodiments of this application, this application provides a coating machine, including the back roller 100 according to any one of the foregoing implementations.

According to some embodiments of this application, this application provides a preparation method for extending the service life of a back roller 100 of a coating machine. With reference to FIG. 1 to FIG. 11, the method includes the following steps.

1. Use 40CR as a material of the back roller 100. Perform preliminary processing and then thermal refining. That is, thermal refining is performed on a first part 12 and second parts 13.
2. Perform roughing, hot-fitting, and then welding on the first part 12 and the second parts 13.
3. After the hot-fitting, wait until the temperature falls to the room temperature, and then complete full welding between the first part 12 and the second parts 13.
4. After the full welding, perform thermal refining in its entirety.
5. After the thermal refining and cooling, perform roughing in its entirety.
6. Perform intermediate frequency quenching on a roll surface 11 of the first part 12 to HRC55-60, with a quenching depth required to be ≥8 mm.
7. After the roller surface 11 is cooled to the room temperature, spray tungsten carbide and ensure that thickness of a tungsten carbide coating is >100 μm.
8. After the tungsten carbide spraying is completed, perform cryogenic treatment on the entire back roller 100, with a liquid nitrogen cryogenic temperature of −190° C., and set aside the back roller 100 for 24 h.
9. After the cryogenic treatment is completed, perform tempering at 160° C., and set aside the back roller 100 for 12 h.
10. After the tempering is completed, perform finish turning on a profile length and a diameter to reserved sizes.
11. Perform fine grinding on the roller surface 11 to obtain a required size.
12. Perform fine grinding on cylindrical structures on the second parts 13.
13. Electroplate positions of the second parts 13 and then perform fine grinding.
14. Perform dynamic balancing collection on roller shafts.
15. Finally, perform cylindrical grinding.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, the technical features mentioned in the embodiments can be combined in any manner, provided that there is no structural conflict. This application is not limited to the specific embodiments disclosed in this specification but includes all technical solutions falling within the scope of the claims.

Technical features in the foregoing embodiments may be combined in any way. For brevity of description, possible combinations of the technical features in the foregoing embodiments are not described all. However, provided that there is no contradiction among combinations of these technical features, all the combinations should be considered within a range recorded in this specification.

The foregoing embodiments merely describe several implementations of this application more specifically and in more detail, but cannot be thus understood as a limitation to the patent scope of this application. It should be noted that persons of ordinary skill in the art may also make several variations and improvements without departing from the concept of this application. All these variations and improvements fall within the protection scope of this application. Therefore, the patent protection scope of this application shall be subject to the appended claims.

What is claimed is:

1. A back roller, comprising:

a roller body, having an axis and a roll surface disposed around the axis; wherein the roller body comprises a first part and two second parts, the first part has the axis and the roll surface, and the two second parts are respectively connected to two opposite ends of the first part along a direction of the axis; and a wear-resistant layer, covering the roll surface, wherein Vickers hardness of the wear-resistant layer is denoted as H, and 800 HV≤H≤1400 HV:

wherein thickness of the wear-resistant layer is denoted as h, and h>0.1 mm; and wherein the wear-resistant layer is formed as a tungsten carbide plating;

wherein the first part is made from a chromium-containing alloy steel having a uniform crystal distribution with retained austenite having been martensitized; and the two second parts are respectively embedded and hot fitted in two opposite ends of a through-hole in the first part, wherein welding joints are formed between the two second parts and the first part, wherein the roll surface is a frequency quenched surface.

2. The back roller according to claim 1, wherein the Vickers hardness H further meets the following condition: 1200 HV≤H≤1400 HV.

3. The back roller according to claim 1, wherein the roller body further comprises a connector, a through-hole is provided in the first part along the direction of the axis, the connector is located in the through-hole, and the two second parts are connected to two ends of the connector along the direction of the axis and the two second parts and the connector are assembled into an integral structure; wherein an outer diameter of one second part is smaller than an outer diameter of the other second part, such that the second part with the smaller outer diameter can pass through the through-hole and can be inserted into the through-hole from an end close to a first limiting portion of the first part and led out from another end of the through-hole until a second limiting portion, on the second part with the larger outer diameter and the first limiting portion fit together for position limiting.

4. A method for preparing the back roller according to claim 1, comprising:

providing a roller blank, wherein the roller blank has an axis and a roll surface disposed around the axis;

performing surface treatment on the roll surface to form a wear-resistant layer on the roll surface;

performing heat treatment on the surface-treated roller blank; and after the heat treatment, processing the roller blank according to a specified size to obtain the back roller.

5. The method according to claim 4, wherein performing the heat treatment on the surface-treated roller blank comprises:

performing cryogenic treatment on the surface-treated roller blank to leave the roller blank at any temperature between −196° C. and −180° C. for at least 20 h to 28 h, wherein the roller blank is made of chromium-containing alloy steel; and after the cryogenic treatment, performing tempering treatment on the roller blank.

6. The method according to claim 5, wherein performing the cryogenic treatment on the surface-treated roller blank comprises:

consecutively reducing a temperature of an ambient environment of the roller blank at least twice in a step-wise manner within a first preset period of time, so that the temperature of the ambient environment of the roller blank falls to any temperature value between −196° C. and −180° C.;

keeping the temperature of the ambient environment unchanged, so that the roller blank stands for 20 h to 28 h; and after the standing, consecutively increasing the temperature of the ambient environment of the roller blank at least twice in a step-wise manner within a second preset period of time, so that temperature of the ambient environment of the roller blank rises to any temperature value between 10° C. and 30° C.

7. The method according to claim 6, wherein during each step-wise temperature reduction, within a first specified period of time, the temperature is reduced by a first temperature value at a preset cooling rate, and then kept unchanged, wherein the first preset period of time comprises several first specified periods of time.

8. The method according to claim 7, wherein the first specified period of time is a time value ranging from 4 h to 6 h, and the first temperature value is a temperature value ranging from 10° C. to 40° C.

9. The method according to claim 6, wherein during each step-wise temperature rise, within a second specified period of time, the temperature is first increased by a second temperature value at a preset heating rate, and then kept unchanged, wherein the second preset period of time comprises several second specified periods of time.

10. The method according to claim 9, wherein the second specified period of time is a time value ranging from 4 h to 6 h, and the second temperature value is a temperature value ranging from 40° C. to 90° C.

11. The method according to claim 4, wherein the step of performing surface treatment on the roll surface comprises:

spraying a tungsten carbide coating on the roll surface to form the wear-resistant layer.

12. The method according to claim 4, wherein providing the roller blank comprises:

respectively mounting two second parts at two opposite ends of a first part in a hot-fitting manner, and welding joints between the two second parts and the first part to form an intermediate part with the roll surface;

performing thermal refining on the intermediate part; and after the thermal refining, performing intermediate frequency quenching on the roll surface to obtain the roller blank.

13. A coating machine, comprising the back roller according to claim 1.

* * * * *